US012731434B2

(12) United States Patent
Liu et al.

(10) Patent No.: US 12,731,434 B2
(45) Date of Patent: Sep. 8, 2026

(54) EVENT DETECTION SYSTEM, EVENT DETECTION METHOD, AND NON-TRANSITORY COMPUTER READABLE MEDIUM

(71) Applicant: NEC Corporation, Tokyo (JP)

(72) Inventors: Jianquan Liu, Tokyo (JP); Noboru Yoshida, Tokyo (JP); Ryo Kawai, Tokyo (JP); Uiko Morimoto, Tokyo (JP); Hirotaka Gochou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 18/293,652

(22) PCT Filed: Aug. 16, 2021

(86) PCT No.: PCT/JP2021/029903
§ 371 (c)(1),
(2) Date: Jan. 30, 2024

(87) PCT Pub. No.: WO2023/021550
PCT Pub. Date: Feb. 23, 2023

(65) Prior Publication Data

US 2024/0338976 A1 Oct. 10, 2024

(51) Int. Cl.

*G06V 40/20* (2022.01)
*G06V 10/75* (2022.01)
*G06V 20/52* (2022.01)

(52) U.S. Cl.

CPC .............. *G06V 40/20* (2022.01); *G06V 10/75* (2022.01); *G06V 20/52* (2022.01)

(58) Field of Classification Search

CPC ......... G06V 40/20; G06V 20/52; G06V 10/75
See application file for complete search history.

(56) References Cited

U.S. PATENT DOCUMENTS 10,956,971 B2 * 3/2021 Mendez ................. G06Q 40/02
11,086,594 B2 * 8/2021 Lapidot .................. G06V 40/28
(Continued)

FOREIGN PATENT DOCUMENTS

JP 2003-115088 A 4/2003
JP 2005-004256 A 1/2005
(Continued)

OTHER PUBLICATIONS

JP Office Communication for JP Application No. 2023-542039, mailed on May 13, 2025 with English Translation.
(Continued)

*Primary Examiner* — Gregory M Desire
(74) *Attorney, Agent, or Firm* — Sughrue Mion, PLLC

(57) ABSTRACT

An event detection system (10) includes: a calculation unit (16) that calculates a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and a determination unit (17) that determines that an event related to the ATM has been detected when the degree of similarity is equal to or
(Continued)

greater than a predetermined threshold. Thus, a problematic event at an ATM can be easily detected while protecting privacy.

14 Claims, 15 Drawing Sheets

(56) References Cited

U.S. PATENT DOCUMENTS 11,328,535 B1* 5/2022 Guo .................... G06V 20/647
11,361,536 B2* 6/2022 Chakravarty ............ G06T 7/20
11,435,845 B2* 9/2022 Rosenbaum .......... G06V 40/20
11,557,122 B2* 1/2023 Toyoda ................. G06V 20/46
11,676,362 B2* 6/2023 Namioka ............ G06V 10/764 382/157
11,749,038 B2* 9/2023 Neill ...................... G06F 16/53 340/5.53
11,869,209 B1* 1/2024 McCracken, Jr. ........ G06T 7/70
11,900,707 B2* 2/2024 Kameda .............. G06V 40/103
2012/0170728 A1* 7/2012 Wengrovitz ........... H04M 3/56 345/173
2015/0189355 A1* 7/2015 Korbecki .............. B33Y 50/02 725/12
2020/0160670 A1 5/2020 Zalewski et al.

FOREIGN PATENT DOCUMENTS

JP 2010-218392 A 9/2010
JP 2010-262408 A 11/2010
JP 2018-010332 A 1/2018
JP 2018-190012 A 11/2018
JP 2020-135747 A 8/2020
WO 2020/003477 A1 1/2020

OTHER PUBLICATIONS

International Search Report for PCT Application No. PCT/JP2021/029903, mailed on Sep. 14, 2021.
Fujishima et al., "Investigation of a phone call detection method using skeleton information with a Kinect", Proceedings of FIT2017 16th Forum on Information Science and Technology 3rd Volume, Sep. 5, 2017, pp. 371-372.
TW Office Action for TW Application No. 111126067, issued on Aug. 1, 2024 with English Translation.

* cited by examiner

Fig. 9
700
PLEASE BEWARE OF
BANK TRANSFER FRAUD!
CONTINUE
END

601

DO YOU WANT TO REGISTER EXTRACTED SKELETAL INFORMATION AS REGISTRATION SKELETAL INFORMATION?

YES NO

EVENT DETECTION SYSTEM, EVENT DETECTION METHOD, AND NON-TRANSITORY COMPUTER READABLE MEDIUM

This application is a National Stage Entry of PCT/JP2021/029903 filed on Aug. 16, 2021, the contents of all of which are incorporated herein by reference, in their entirety.

TECHNICAL FIELD

The present disclosure relates to an event detection system, a monitoring system, an event detection method, and a non-transitory computer readable medium.

BACKGROUND ART

In recent years, a bank transfer fraud in which a person instructs another person to transfer money from an Automatic Teller Machine (ATM) over the phone has become a problem. In ATMs where few or no staff is present, it is required to automatically alert a person who is talking on the phone and performing such a transfer of money operation in accordance with the instructions of another person that the former person is in danger of being a victim of a bank transfer fraud. Therefore, technologies for monitoring the behavior of a person who performs a transfer of money operation and detecting a phone call action have been developed. For example, Patent Literature 1 discloses a phone call determination apparatus which specifies an imaging region of a hand based on the position of a face detected from imaging information and determines whether or not a subject to be imaged is in the middle of a mobile phone call based on the amount of change in the pixel value of the imaging region of the hand.

In order to protect privacy, it is required to detect a phone call action without holding specific pixel information in the imaging information. For example, Patent Literature 2 discloses an action analysis apparatus which generates a skeleton image of a person and a behavior image showing the time change of the skeleton from a plurality of original images, and generates a model capable of learning and inferring an action pattern based on the original images, the skeleton image, and the behavior image.

CITATION LIST

Patent Literature

Patent Literature 1: Japanese Unexamined Patent Application Publication No. 2010-218392

Patent Literature 2: Japanese Unexamined Patent Application Publication No. 2020-135747

SUMMARY OF INVENTION

Technical Problem

However, regarding the method for analyzing actions based on learning disclosed in Patent Literature 2 described above, there is a problem that the preparation of training data costs time and money since a large amount of the training data is required.

In view of the problem described above, an object of the present disclosure is to provide an event detection system, a monitoring system, an event detection method, and a non-transitory computer readable medium that easily detect a problematic event at an ATM while protecting privacy.

Solution to Problem

An event detection system according to one example aspect of the present disclosure includes:

- calculation means for calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and
- determination means for determining that an event related to the ATM has been detected when the degree of similarity is equal to or greater than a predetermined threshold.

A monitoring system according to one example aspect of the present disclosure includes:

- an ATM; and
- an event detection apparatus configured to detect an event related to the ATM, in which
- the event detection apparatus includes:
  - calculation means for calculating a degree of similarity between at least a part of skeletal information extracted from a captured image in which a user who is visiting the ATM is captured and at least a part of registration skeletal information, the registration skeletal information being extracted from a registration image showing a phone call action of a person and being registered in an action database; and
  - determination means for determining that the event has been detected when the degree of similarity is equal to or greater than a predetermined threshold.

An event detection method according to one example aspect of the present disclosure includes:

- calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and
- determining that an event related to the ATM has been detected when the degree of similarity is equal to or greater than a predetermined threshold.

A non-transitory computer readable medium according to one example aspect of the present disclosure stores a program for causing a computer to execute:

- calculation processing for calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and
- determination processing for determining that an event related to the ATM has been detected when the degree of similarity is equal to or greater than a predetermined threshold.

Advantageous Effects of Invention

According to the present disclosure, it is possible to provide an event detection system, a monitoring system, an event detection method, and a non-transitory computer readable medium that easily detect a problematic event at an ATM while protecting privacy.

EXAMPLE EMBODIMENT

The present disclosure will be described hereinafter through example embodiments. However, the following example embodiments are not intended to limit the scope of the disclosure according to the claims. Further, all the components described in the example embodiments are not necessarily essential as means for solving the problem. The same elements are denoted by the same reference symbols throughout the drawings, and redundant descriptions are omitted as necessary.

First Example Embodiment

Figure 1:
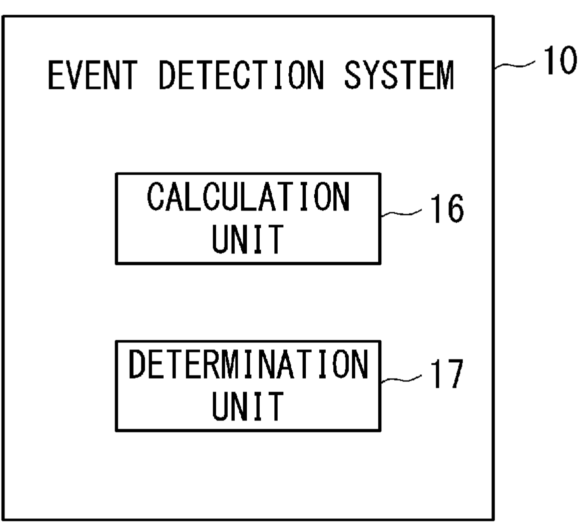
FIG. 1 is a block diagram showing a configuration of an event detection system according to a first example embodiment.

First, a first example embodiment of the present disclosure will be described. FIG. 1 is a block diagram showing a configuration of an event detection system 10 according to the first example embodiment. The event detection system 10 is a computer system that detects an event related to an Automatic Teller Machine (ATM). The event related to an ATM is a problematic event at an ATM, for example, an event suspected of being a bank transfer fraud. The above event includes at least performance of a phone call action by a user visiting an ATM. In the following description, an event related to an ATM may be referred to simply as an event. The event detection system 10 includes a calculation unit 16 and a determination unit 17.

The calculation unit 16 is also referred to as calculation means. The calculation unit 16 compares at least a part of skeletal information extracted from a captured image with at least a part of registration skeletal information, and calculates the degree of similarity between them. The captured image is a captured image in which a user who is visiting an ATM is captured. The registration skeletal information is extracted from a registration image showing a phone call action of a person and is registered in an action database (DB).

The determination unit 17 is also referred to as determination means. The determination unit 17 determines that an event has been detected when the degree of similarity is equal to or greater than a predetermined threshold.

Further, the event detection system 10 executes predetermined processing in response to the detection of the event. For example, the event detection system 10 may transmit warning information to an ATM or a bank management apparatus (not shown) in response to the detection of the event to cause the ATM or the bank management apparatus to output it. Further, for example, the event detection system 10 may record a determination history of the event detection in response to the detection of the event.

As described above, according to the first example embodiment, the event detection system 10 uses skeletal information to detect an event, and thus privacy can be assured. Further, the event detection system 10 uses the degree of similarity calculated based on the comparison between pieces of skeletal information to detect a phone call action, and thus a large amount of training data is not required. Therefore, the event detection system 10 can easily detect an event.

Second Example Embodiment

Figure 2:
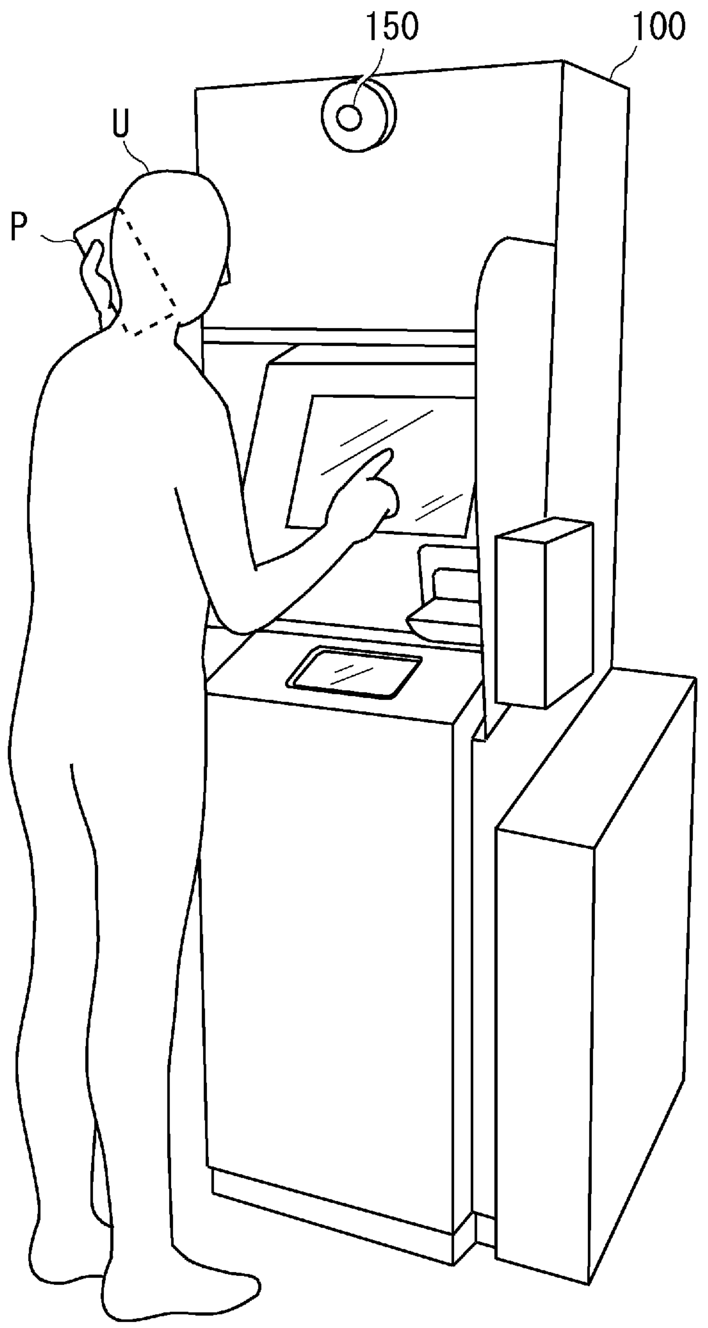
FIG. 2 is a diagram for explaining an event according to a second example embodiment.

Next, a second example embodiment of the present disclosure will be described. FIG. 2 is a diagram for explaining an event according to the second example embodiment. An event to be detected includes at least a phone call using a mobile phone P made by a user U who is visiting an ATM 100. For example, the event may be only a phone call action of the user U, or may be an action of the user U talking on the phone and performing an input operation in the ATM 100.

A camera 150 is disposed in an upper part of the ATM 100. The camera 150 is disposed at a position and an angle at which at least an image of a part of the body of the user U who is visiting the ATM 100 can be captured. In the second example embodiment, although the camera 150 is configured to capture an image of the upper body of the user U, it may instead be configured to capture an image of only the face area of the user U.

Figure 3:
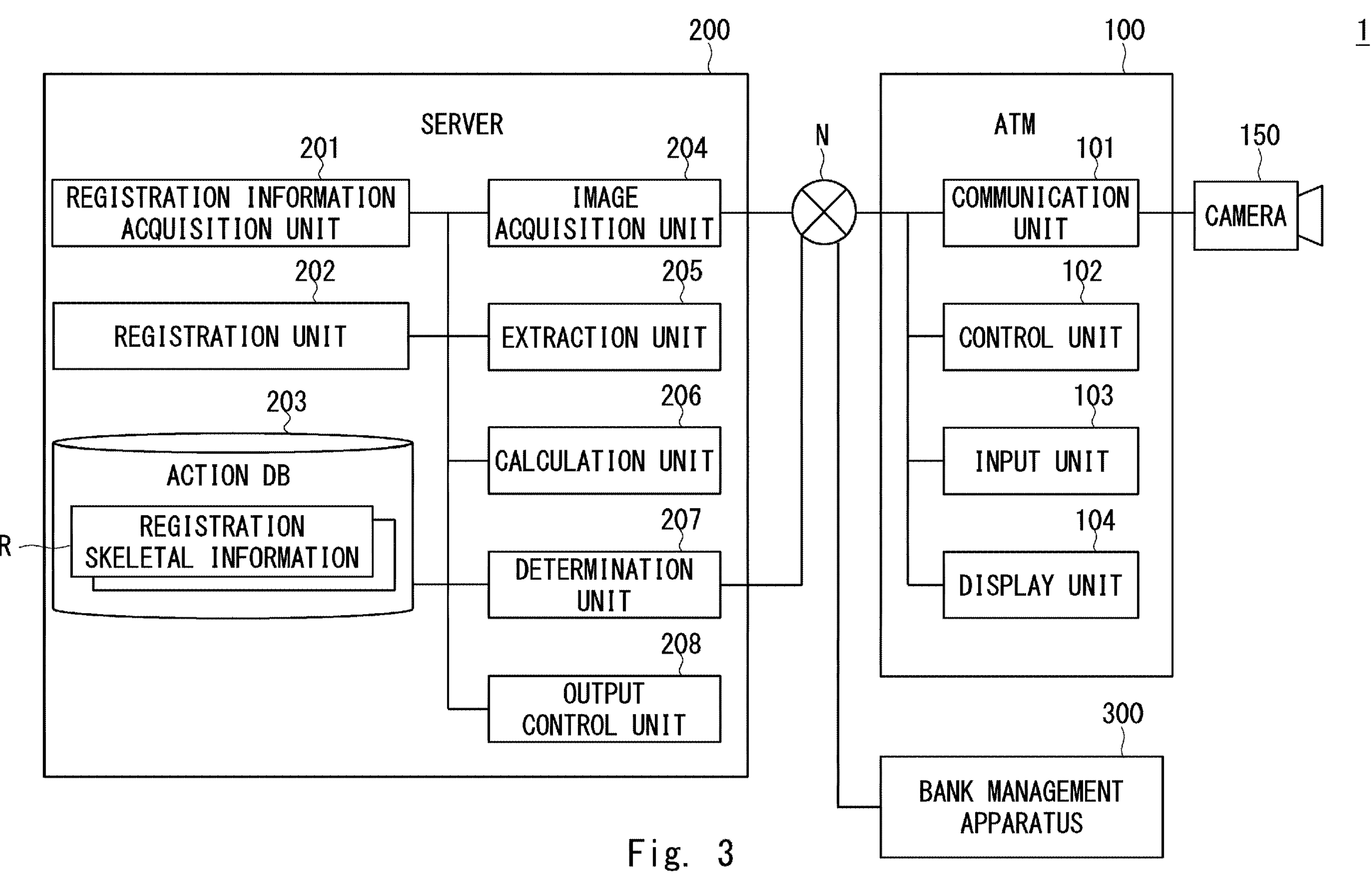
FIG. 3 is a block diagram showing a configuration of a monitoring system according to the second example embodiment.

FIG. 3 is a block diagram showing a configuration of a monitoring system 1 according to the second example embodiment. The monitoring system 1 is a computer system that monitors the user U who is visiting the ATM 100 and executes predetermined processing in response to detecting a target event. The monitoring system 1 includes the camera 150, the ATM 100, a server 200, and a bank management apparatus 300. Each of the apparatuses may be connected to a network N. The network N may be a wired network or a wireless network.

(ATM 100)

The ATM 100 is a computer apparatus that enables a withdrawal, a deposit, and a transfer of cash to be done based on an input operation performed by the user U. Further, the ATM 100 transmits video image data captured by the camera 150 to the server 200. The ATM 100 includes a communication unit 101, a control unit 102, an input unit 103, and a display unit 104.

The communication unit 101 is a communication interface with the network N. The input unit 103 is an input apparatus that receives an input. The display unit 104 is a display apparatus. The input unit 103 and the display unit 104 may be integrally configured as a touch panel.

The control unit 102 controls hardware of the ATM 100. The control unit 102 executes normal processing of the ATM 100 (processing such as a withdrawal, a deposit, and a transfer of cash) based on the user U's input operation received by the input unit 103.

Further, the control unit 102 acquires video image data from the camera 150 through the communication unit 101. Then the control unit 102 transmits the video image data to the server 200 via the network N at a predetermined timing.

For example, the control unit 102 starts the transmission of the video image data to the server 200 in response to a reception of a predetermined first operation by the input unit 103. Note that the transmission of the video image data may be a transmission of a series of video image data including a plurality of frame images or a transmission of a unit of frame images. The first operation may be an operation performed by the user U for starting various services (a withdrawal, a deposit, or a transfer of cash) using an ATM (such as starting a screen), or an operation performed by the user U for starting a transfer service (such as selecting "transfer"). Further, the first operation may be a specific operation for receiving various services. As an example, the first operation may be an operation for inserting a cash card or a passbook into an ATM, or an operation for inputting a personal identification number.

Further, for example, the control unit 102 ends the transmission of the video image data to the server 200 in response to a reception of a predetermined second operation by the input unit 103. The second operation is an operation different from the first operation. The second operation may be an operation for ending various services at the ATM (such as selecting "end"), or an operation performed by the user U for ending the transfer service (such as selecting "start next transaction"). Note that the trigger for ending the transmission of the video image data to the server 200 may be, instead of the reception of the second operation, that no operation is received for a predetermined period of time or that the ATM 100 has executed processing for returning a cash card or a passbook.

Further, when the control unit 102 receives warning information from the server 200 through the communication unit 101, it causes the display unit 104 to display the warning information. At this time, the control unit 102 may cause a voice output unit (not shown) to output the warning information by voice.

(Server 200)

The server 200 is a computer apparatus that detects an event based on video image data received from the ATM 100. That is, the server 200 is an example of the above-described event detection system 10. Further, the server 200 transmits warning information to the ATM 100 or the bank management apparatus 300 in response to the detection of the event. The server 200 includes a registration information acquisition unit 201, a registration unit 202, an action DB 203, an image acquisition unit 204, an extraction unit 205, a calculation unit 206, a determination unit 207, and an output control unit 208.

The registration information acquisition unit 201 is also referred to as registration information acquisition means. The registration information acquisition unit 201 acquires a registration image showing at least a phone call action of a person by a registration request from the bank management apparatus 300 or by an operation performed by an administrator of the server 200. The registration image may be an image of a person simply talking on the phone, or an image showing an action of a person talking on the phone and performing an input operation in an ATM. Note that the registration image may be a still image (one frame image), or a moving image including a series of a plurality of frame images. The registration information acquisition unit 201 supplies the acquired registration image to the registration unit 202.

The registration unit 202 is also referred to as registration means. The registration unit 202 supplies a registration image to the extraction unit 205 described later, and acquires from the extraction unit 205 skeletal information extracted from the registration image as registration skeletal information R. Then the registration unit 202 registers the acquired registration skeletal information R in the action DB 203 as an action included in an event to be detected.

The action DB 203 is a storage apparatus that stores a plurality of pieces of the registration skeletal information R corresponding to actions included in the event to be detected. Note that the number of pieces of the registration skeletal information R stored in the action DB 203 is not limited to a plural number and may instead be one.

The image acquisition unit 204 is also referred to as image acquisition means. The image acquisition unit 204 acquires video image data received from the ATM 100 and a frame image (a captured image) included in the video image data. That is, the image acquisition unit 204 acquires the frame image in response to a detection of a first operation signal for the first operation by the ATM 100. Note that the first operation signal is a signal indicating that the input unit 103 has received the first operation performed by the user U in the ATM 100. The image acquisition unit 204 supplies the acquired frame image to the extraction unit 205.

The extraction unit 205 is also referred to as extraction means. The extraction unit 205 detects an image area of the body of a person (a body area) from the frame image and extracts (e.g., cuts out) it as a body image. Then the extraction unit 205 extracts skeletal information about at least a part of the body of the person based on the features of the person such as the joints recognized in the body image by using a skeleton estimation technique using machine learning. The skeletal information is composed of "key points", which are characteristic points such as the joints, and "bones (bone links)", which indicate links between the key points. The extraction unit 205 may use a skeleton estimation technique such as OpenPose. The extraction unit 205 supplies the extracted skeletal information to the calculation unit 206.

The calculation unit 206 is an example of the above-described calculation unit 16. The calculation unit 206 calculates the degree of similarity between the extracted skeletal information and each registration skeletal information R registered in the action DB 203. Note that an object to be calculated by the calculation unit 206 may be, instead of the above degree of similarity, the degree of similarity between a part of the extracted skeletal information and each registration skeletal information R, the degree of similarity between the extracted skeletal information and a part of each registration skeletal information, or the degree of similarity between a part of the extracted skeletal information and a part of each registration skeletal information.

Note that the calculation unit 206 may calculate the above-described degree of similarity by using the skeletal information directly or indirectly. For example, the calculation unit 206 may calculate the above-described degree of similarity by converting both at least a part of the extracted skeletal information and at least a part of each registration skeletal information R registered in the action DB 203 into another format and calculating the degree of similarity between the converted pieces of information. In this case, the above-described degree of similarity may be the degree of similarity between the converted pieces of information itself or a value calculated using the degree of similarity between the converted pieces of information. The conversion method may be normalization of the size of skeletal information, conversion into feature values using each angle (i.e., the degree of the bending of the joint) formed by the bones, or conversion into three-dimensional posture information based on a machine learning model that has been trained in advance.

The determination unit 207 is an example of the above-described determination unit 17. The determination unit 207 specifies the number of pieces of the registration skeletal information R in which the degree of similarity calculated by the calculation unit 206 is equal to or greater than a predetermined threshold. Then the determination unit 207 determines whether or not an event has been detected based on the specified number of pieces of the registration skeletal information R. In the second example embodiment, the determination unit 207 determines that an event has been detected when at least one registration skeletal information R in which the degree of similarity is equal to or greater than a predetermined threshold is present, while it does not determine that an event has been detected when no registration skeletal information R in which the degree of similarity is equal to or greater than a predetermined threshold is present. Alternatively, however, the determination unit 207 may determine that an event has been detected when a predetermined number or more of pieces of the registration skeletal information R in which the degree of similarity is equal to or greater than a predetermined threshold are present, while it may not determine that an event has been detected when less than a predetermined number of pieces of the registration skeletal information R in which the degree of similarity is equal to or greater than a predetermined threshold are present. The determination unit 207 supplies a result of the determination to the output control unit 208.

When the determination unit 207 determines that an event has been detected, the output control unit 208 transmits warning information to the ATM 100 and the bank management apparatus 300. Note that a transmission destination of the warning information may be either the ATM 100 or the bank management apparatus 300.

(Bank Management Apparatus 300)

The bank management apparatus 300 is a computer apparatus used by a bank staff. The bank management apparatus 300 transmits a registration request for registration of a phone call action in the action DB 203 to the server 200. At this time, the registration request includes a registration image. Further, in response to the reception of the warning information from the server 200, the bank management apparatus 300 displays the warning information or outputs the warning information by voice to notify a bank staff that an event has occurred. By knowing the occurrence of the event, the bank staff can take measures such as rushing to the place where the event has occurred.

Figure 4:
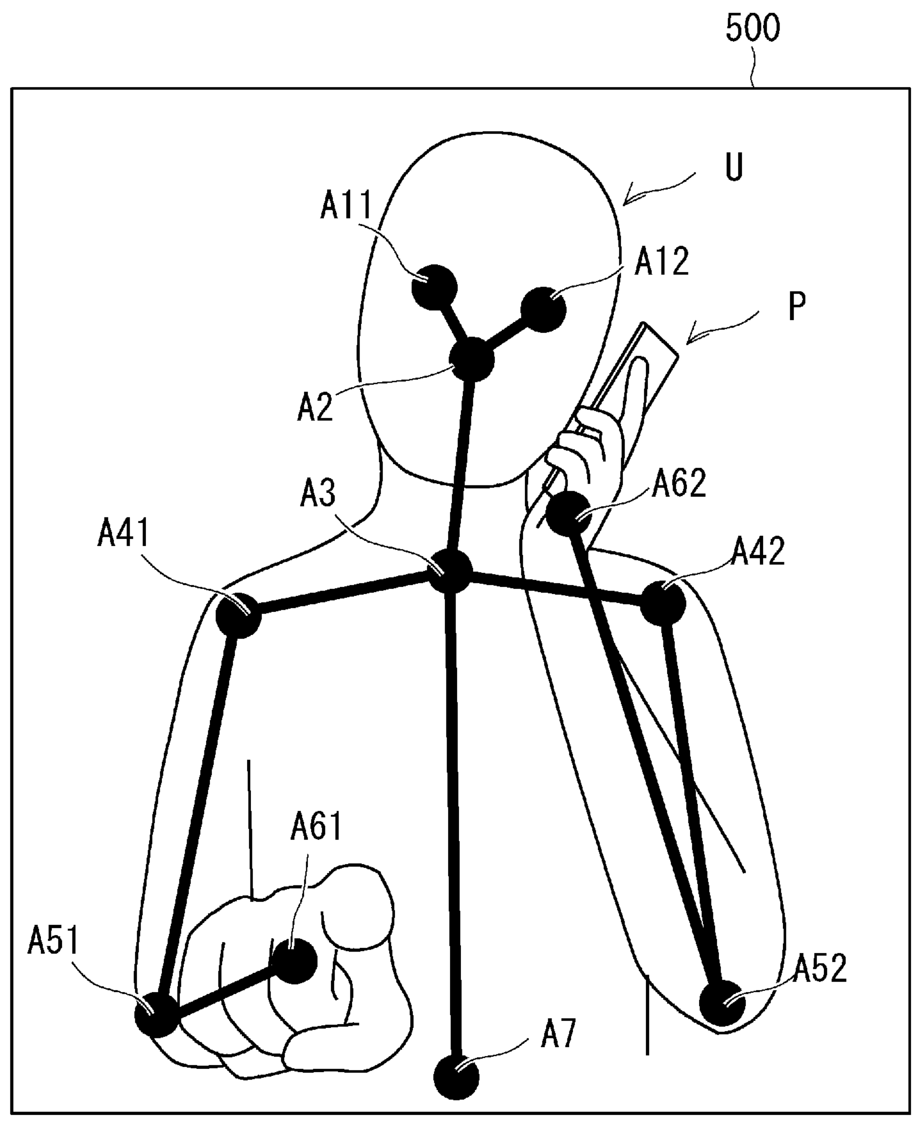
FIG. 4 is a diagram showing skeletal information extracted from a frame image according to the second example embodiment.

FIG. 4 is a diagram showing skeletal information extracted from a frame image 500 according to the second example embodiment. The frame image 500 includes an image area of the upper body of the user U who is talking on the mobile phone P. Further, the skeletal information shown in FIG. 4 includes a plurality of key points and a plurality of bones detected from the upper body. As an example, in FIG. 4, a right eye A11, a left eye A12, a head A2, a neck A3, a right shoulder A41, a left shoulder A42, a right elbow A51, a left elbow A52, a right hand A61, a left hand A62, and a waist A7 are shown as the key points.

The server 200 compares the above skeletal information with the registration skeletal information R corresponding to the upper body and determines whether or not they are similar to each other, thereby detecting a phone call action. Note that whether the hand is positioned near the head is important in order to detect a phone call action. Therefore, the server 200 may calculate the degree of similarity by weighting the positional relationship between the right hand A61 and the right eye A11 or the head A2, and the positional relationship between the left hand A62 and the left eye A12 or the head A2. Alternatively, the server 200 may use only skeletal information about the right eye A11, the left eye A12, the head A2, the right hand A61, and the left hand A62 in the extracted skeletal information for calculation of the degree of similarity. Further, a phone call action includes, in addition to a form in which a person is talking on the mobile phone P while the person is holding the mobile phone P with the person's hand, a form in which a person is talking on the mobile phone P while the person is holding the mobile phone P by the person's shoulder and has the person's ear close to the mobile phone P. In this case, the positional relationship between the right shoulder A41 and the right eye A11 or the head A2, and the positional relationship between the left shoulder A42 and the left eye A12 or the head A2 may be added to the objects to be weighted. Alternatively, the server 200 may add skeletal information about the right shoulder A41 and the left shoulder A42 as skeletal information used for calculation of the degree of similarity in addition to the skeletal information about the right eye A11, the left eye A12, the head A2, the right hand A61, and the left hand A62.

Figure 5:
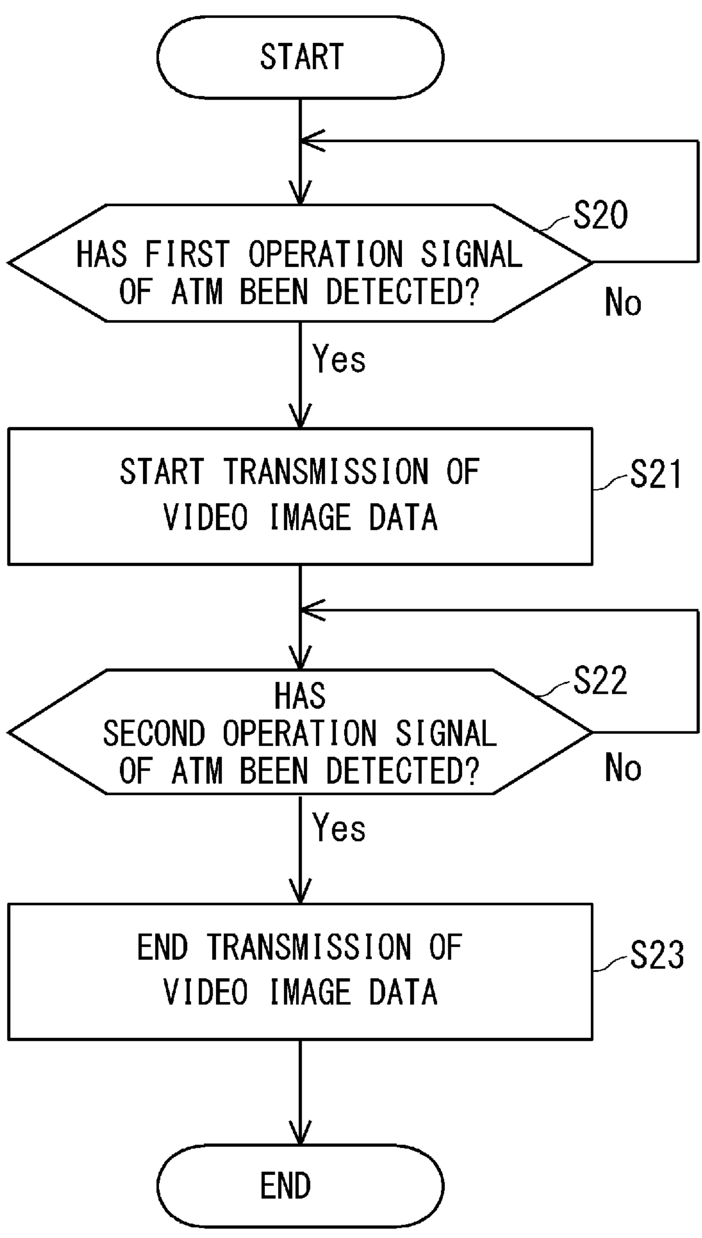
FIG. 5 is a flowchart showing a flow of a method for transmitting video image data performed by an ATM according to the second example embodiment.

FIG. 5 is a flowchart showing a flow of a method for transmitting video image data performed by the ATM 100 according to the second example embodiment. First, the control unit 102 of the ATM 100 determines whether or not the first operation signal for the first operation in the ATM 100 has been detected (S20). When the control unit 102 determines that the first operation signal has been detected (Yes in S20), it starts transmission of the video image data acquired from the camera 150 to the server 200 (S21). On the other hand, when the control unit 102 does not determine that the first operation signal has been detected (No in S20), it repeats the processing of S20. Next, the control unit 102 determines whether or not the second operation signal for the second operation in the ATM 100 has been detected (S22). When the control unit 102 determines that the second operation signal has been detected (Yes in S22), it ends transmission of the video image data acquired from the camera 150 to the server 200 (S23). On the other hand, when the control unit 102 does not determine that the second operation signal has been detected (No in S22), it repeats the processing of S22.

Note that, in the flowchart described above, although the trigger for the start and the end of the transmission of the video image data is set to be the operation signal of the ATM 100, the present disclosure is not limited thereto. For example, the control unit 102 may detect the trigger for the start and the end of the transmission of the video image data by analyzing the video image data acquired from the camera 150. For example, the control unit 102 may start the transmission of the video image data when the body area of a person different from the previous one is first detected from the video image data. Further, when the body area of a person different from the previous one is detected from the video image data and then the body area of the person first disappears, the control unit 102 may end the transmission of the video image data.

As described above, by limiting the period during which video image data is transmitted to a period between a predetermined start trigger and a predetermined end trigger, the amount of communication data can be minimized. Further, since event detection processing performed by the server 200 can be omitted outside the period, computational resources can be saved.

Figure 6:
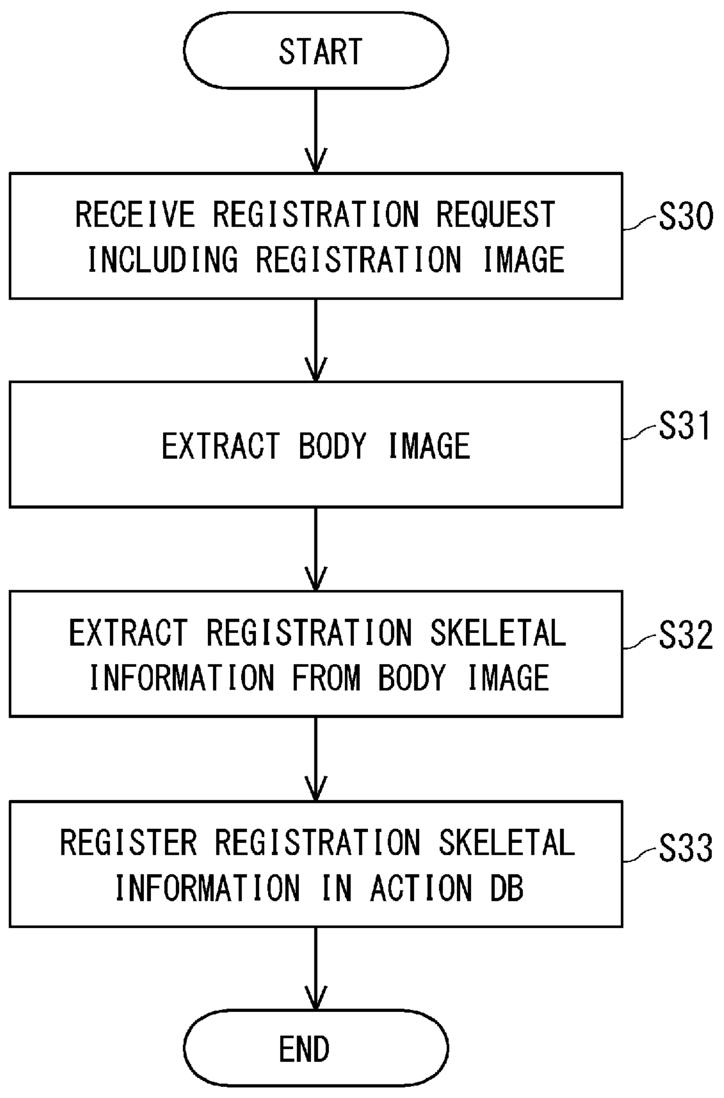
FIG. 6 is a flowchart showing a flow of a method for registering information in an action DB performed by a server according to the second example embodiment.

FIG. 6 is a flowchart showing a flow of a method for registering information in the action DB performed by the server 200 according to the second example embodiment. First, the registration information acquisition unit 201 of the server 200 receives a registration request including a registration image from the bank management apparatus 300 (S30). Next, the registration unit 202 supplies the registration image to the extraction unit 205. The extraction unit 205, which has acquired the registration image, extracts a body image from the registration image (S31). Next, the extraction unit 205 extracts the registration skeletal information R from the body image (S32). At this time, the extraction unit 205 may use the whole skeletal information extracted from the body image as the registration skeletal information R, or may use only a part of the skeletal information (e.g., skeletal information about the right eye, the left eye, the head, the right hand, and the left hand) as the registration skeletal information R. Next, the registration unit 202 acquires the registration skeletal information R from the extraction unit 205, and registers the registration skeletal information R in the action DB 203 (S33).

Figure 7:
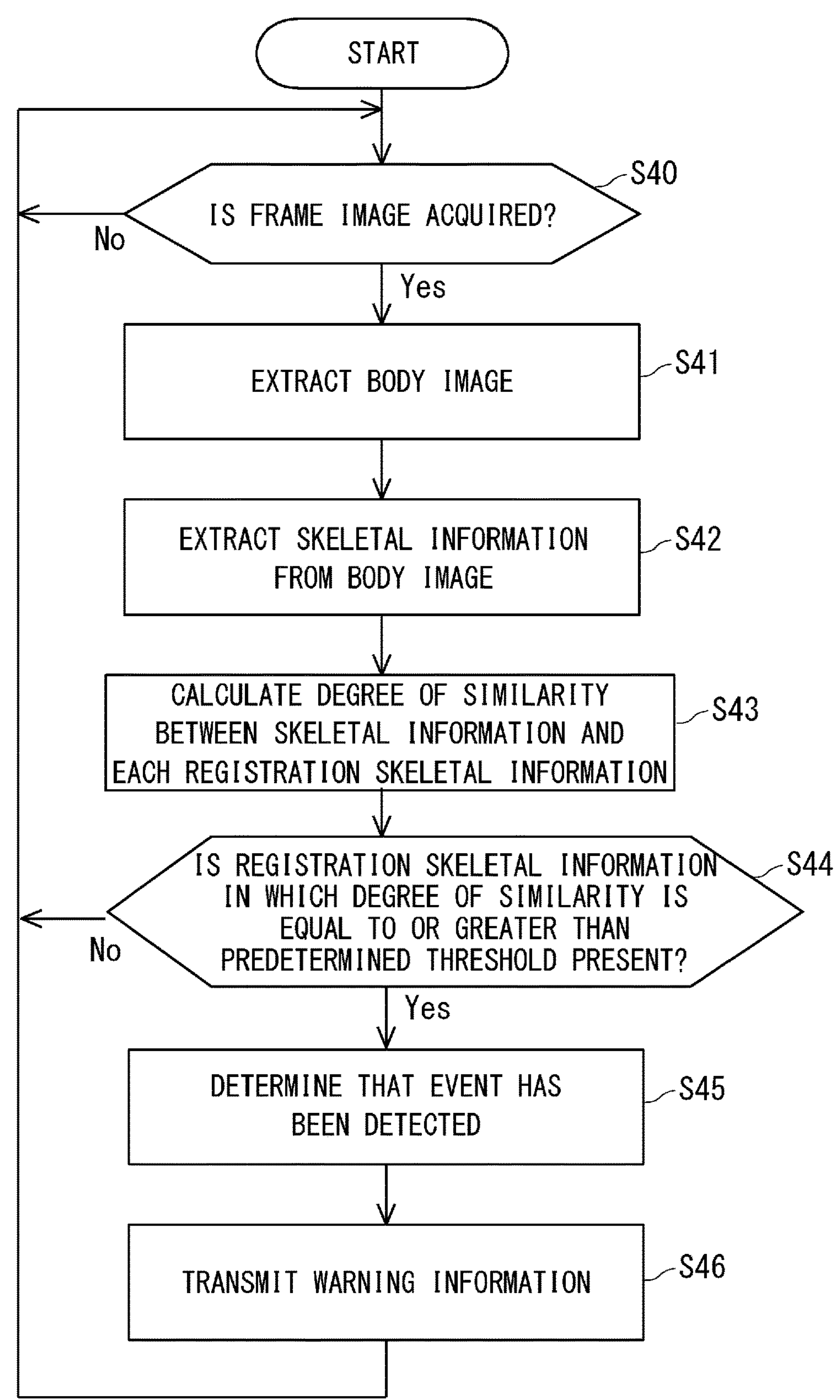
FIG. 7 is a flowchart showing a flow of an event detection method performed by a server according to the second example embodiment.

FIG. 7 is a flowchart showing a flow of an event detection method performed by the server 200 according to the second example embodiment. When the image acquisition unit 204 of the server 200 acquires video image data and a frame image included in the video image data from the ATM 100 (Yes in S40), the extraction unit 205 extracts a body image from the frame image (S41). Next, the extraction unit 205 extracts skeletal information from the body image (S42). The calculation unit 206 calculates the degree of similarity between at least a part of the extracted skeletal information and each registration skeletal information R registered in the action DB 203 (S43). Next, the determination unit 207 determines whether or not registration skeletal information R in which the degree of similarity is equal to or greater than a predetermined threshold is present (S44). When registration skeletal information R in which the degree of similarity is equal to or greater than a predetermined threshold is present (Yes in S44), the determination unit 207 determines that an event has been detected (S45). Then the output control unit 208 transmits warning information indicating that an event has been detected to the bank management apparatus 300 and the ATM 100 (S46), and returns the processing to S40. On the other hand, when no registration skeletal information R in which the degree of similarity is equal to or greater than a predetermined threshold is present (No in S44), the determination unit 207 does not determine that an event has been detected and returns the processing to S40.

Figure 8:
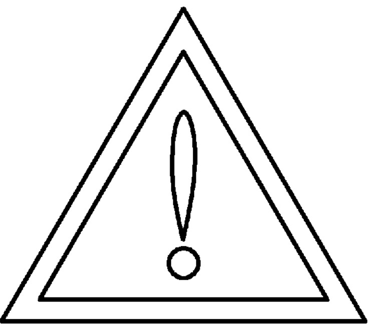
FIG. 8 is a diagram showing an example of a display screen of a bank management apparatus according to the second example embodiment.

A display screen 600 shown in FIG. 8 may be displayed on a display unit (not shown) of the bank management apparatus 300 that has received the warning information. FIG. 8 is a diagram showing an example of the display screen 600 of the bank management apparatus 300 according to the second example embodiment. For example, a message "There is a possibility that a bank transfer fraud may occur." and the location or the identification information of the ATM 100 where an event has been detected may be displayed on the display screen 600. By doing so, a bank staff can then take measures such as rushing to the place where the event has occurred, and thus a bank transfer fraud can be prevented from occurring.

Figure 9:
FIG. 9 is a diagram showing an example of a display screen of an ATM according to the second example embodiment.

Further, a display screen 700 shown in FIG. 9 may be displayed on the display unit 104 of the ATM 100 that has received the warning information. FIG. 9 shows an example of the display screen 700 of the ATM 100 according to the second example embodiment. For example, a message "Please beware of a bank transfer fraud!" and an input area for selecting whether to continue or end the service may be displayed on the display screen 700. By doing so, the user U can recognize that the user U is about to be involved in a bank transfer fraud, and thus a bank transfer fraud can be prevented from occurring.

Note that the ATM 100 which has received the warning information may, instead of or in addition to performing display on the display screen 700, slow down the processing speed or give the user U a waiting time intentionally so that the user U can check whether or not a bank transfer fraud is occurring. By doing so, like in the above cases, a bank transfer fraud can be prevented from occurring.

As described above, according to the second example embodiment, the server 200 uses skeletal information to detect an event, and thus privacy can be assured. Further, the server 200 uses the degree of similarity based on the comparison between pieces of skeletal information to detect a phone call action, and thus a large amount of training data is not required. Therefore, the server 200 can easily detect an event.

In the second example embodiment described above, a monitoring burden on the bank staff may increase and a psychological burden on the user U may increase when too many events are detected and too many warnings are issued. Therefore, stricter conditions for detecting an event may be used. As an example of a case in which the conditions for detecting an event are made strict, the determination unit 207 of the server 200 may detect an event when the user U is performing a phone call action and the attribute of the user U is a predetermined one. That is, when the degree of similarity between pieces of the skeletal information is equal to or greater than a predetermined threshold and it is determined that the user U has a predetermined attribute, the determination unit 207 may determine that an event has been detected. The predetermined attribute may be an elderly person, having an amount of deposit equal to or greater than a predetermined amount, having a history of a predetermined disease, living alone, having been involved in a bank transfer fraud in the past, or the like.

The server 200 may acquire attribute information of a user based on information read by the ATM 100. As an example, the ATM 100 first reads a user ID (an account number, name, or the like) recorded in a passbook or a cash card and asks the bank management apparatus 300 for attribute information of the user U. Then the ATM 100 transmits the attribute information of the user U to the server 200. Further, as an example, the ATM 100 first reads a user ID recorded in a passbook or a cash card and transmits the user ID to the server 200. Then the server 200 asks the bank management apparatus 300 for the attribute information of the user U using the user ID. In this way, the server 200 can easily acquire the attribute information of the user U. Note that, when the predetermined attribute can be estimated from the appearance, such as the age, the server 200 may estimate the attribute information of the user U by performing an image analysis from the video image data acquired from the ATM 100 instead of the information read by the ATM 100.

Figure 10:
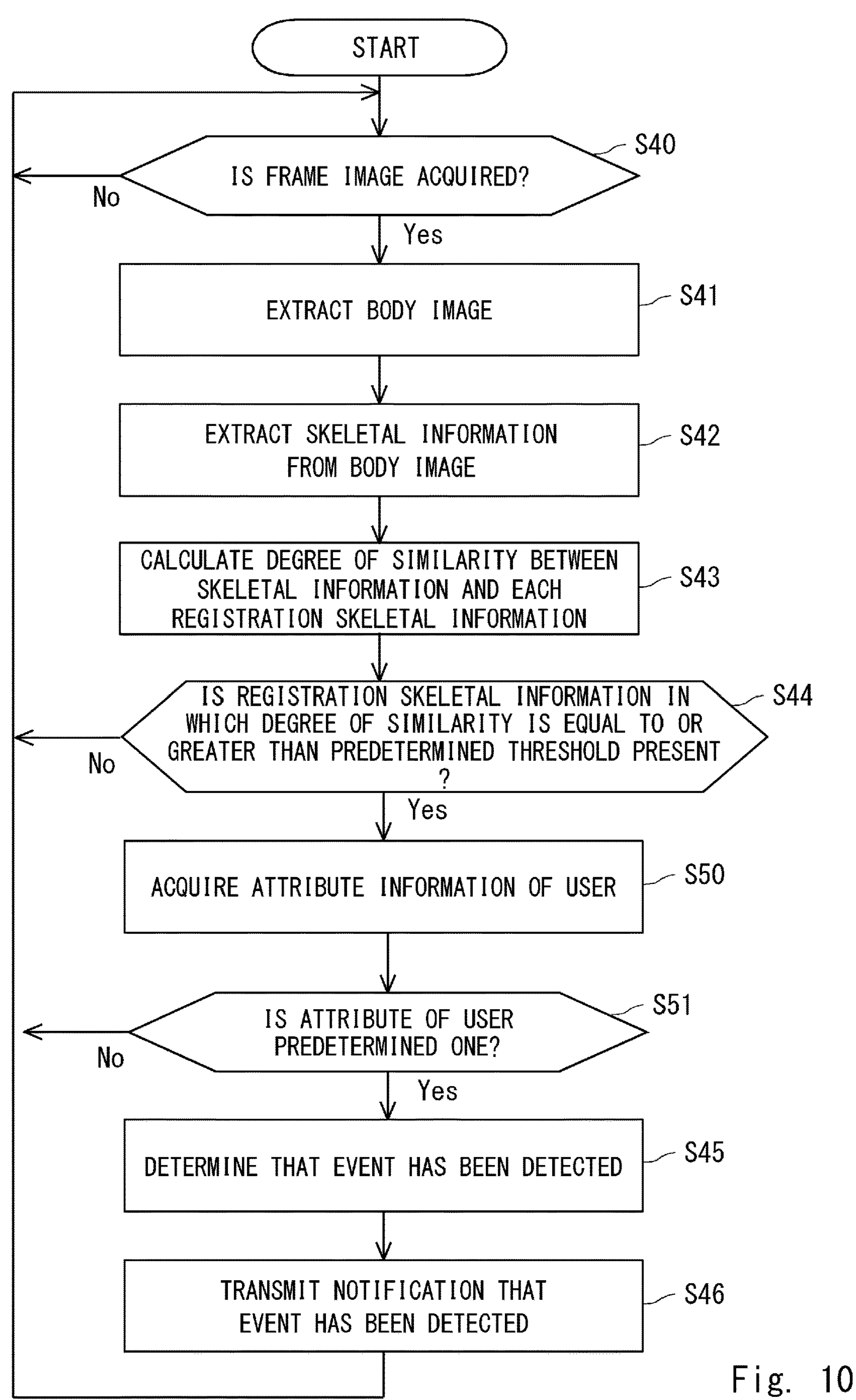
FIG. 10 is a flowchart showing a flow of an event detection method performed by a server according to a modified example of the second example embodiment.

FIG. 10 is a flowchart showing a flow of an event detection method performed by the server 200 according to a modified example of the second example embodiment. Steps shown in FIG. 10 include S50 to S51 in addition to S40 to S46 in FIG. 7.

First, the server 200 performs processing similar to that in S40 to S44 in FIG. 7. When registration skeletal information R in which the degree of similarity is equal to or greater than a predetermined threshold is present (Yes in S44), the determination unit 207 acquires attribute information of the user U by the method described above (S50). Next, the determination unit 207 determines whether or not the attribute of the user U is a predetermined one (S51). When the attribute of the user U is a predetermined one (Yes in S51), the determination unit 207 determines that an event has been detected (S45). Then the output control unit 208 transmits warning information indicating that an event has been detected to the bank management apparatus 300 and the ATM 100 (S46), and returns the processing to S40. On the other hand, when the attribute of the user U is not a predetermined one (No in S51), the determination unit 207 does not determine that an event has been detected and returns the processing to S40.

Further, as another example of a case in which the conditions for detecting an event are made strict, the determination unit 207 of the server 200 may determine that an event has been detected when the degree of similarity between pieces of the skeletal information is equal to or greater than a predetermined threshold and a predetermined operation signal sent to the ATM 100 is detected. The predetermined operation signal may be an operation signal in a transfer service or any other operation signal. By doing so, it is possible to avoid a situation in which the user U is not receiving a transfer instruction over the phone and instead is simply talking on the phone in front of the ATM 100 from being detected as being an event.

By making the conditions for detecting an event strict as described above, it is possible to prevent too many warnings from being issued. As a result, the monitoring burden on the bank staff can be reduced, and the psychological burden on the user U can be reduced.

Figure 11:
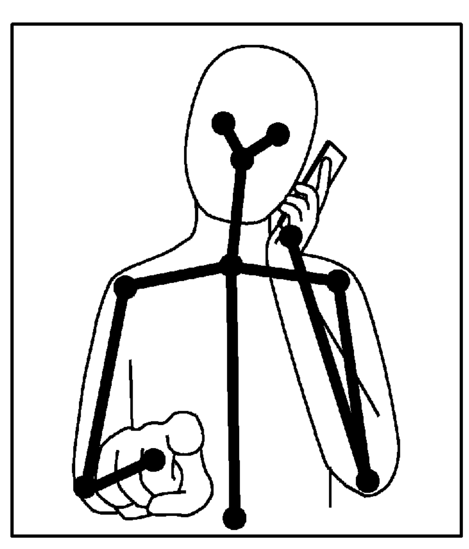
FIG. 11 is a diagram showing an example of a display screen according to the modified example of the second example embodiment.

Further, the registration unit 202 of the server 200 may ask the bank management apparatus 300 whether or not to newly register the skeletal information extracted from the frame image in the action DB 203 when it is determined that the user U has the predetermined attribute described above. FIG. 11 is a diagram showing an example of a display screen 601 according to the modified example of the second example embodiment. The display screen 601 shown in FIG. 11 may be displayed on a display unit (not shown) of the bank management apparatus 300. For example, the extracted skeletal information and a message "Do you want to register the extracted skeletal information as registration skeletal information?" may be displayed on the display screen 601. Note that, although the skeletal information is superimposed on the frame image on the display screen 601 in FIG. 11, the frame image may be omitted in order to protect privacy. When a bank staff selects "Yes", a registration request is transmitted from the bank management apparatus 300 to the registration unit 202 of the server 200. The registration unit 202 that has received the registration request registers the skeletal information as the registration skeletal information R in the action DB 203.

Therefore, the server 200 can determine whether an event has been detected based on various phone call actions performed by a person of the attribute to be monitored during operation. As a result, the determination accuracy can be improved during operation.

Further, skeletal information to be newly registered may not be limited to skeletal information about phone call actions, and may instead be skeletal information about new actions that are not expected when the registration skeletal information R is registered. In this case, even when a person of the attribute to be monitored performs a new action during operation, the skeletal information about this action can be newly registered as the registration skeletal information R. As a result, the range within which an object can be detected can be made larger than that at the time of the registration.

Further, the condition for asking the bank management apparatus 300 for the new registration is not limited to the fact that the user U has the predetermined attribute described above. For example, when the registration unit 202 of the server 200 has detected that the same person appears a plurality of times in a plurality of video image data captured at the times different from each other, it may ask the bank management apparatus 300 whether or not to newly register the extracted skeletal information in the action DB 203. By doing so, actions unique to a suspicious person can be registered in a watch list and used to determine whether an event has been detected.

Third Example Embodiment

Next, a third example embodiment of the present disclosure will be described.

Figure 12:
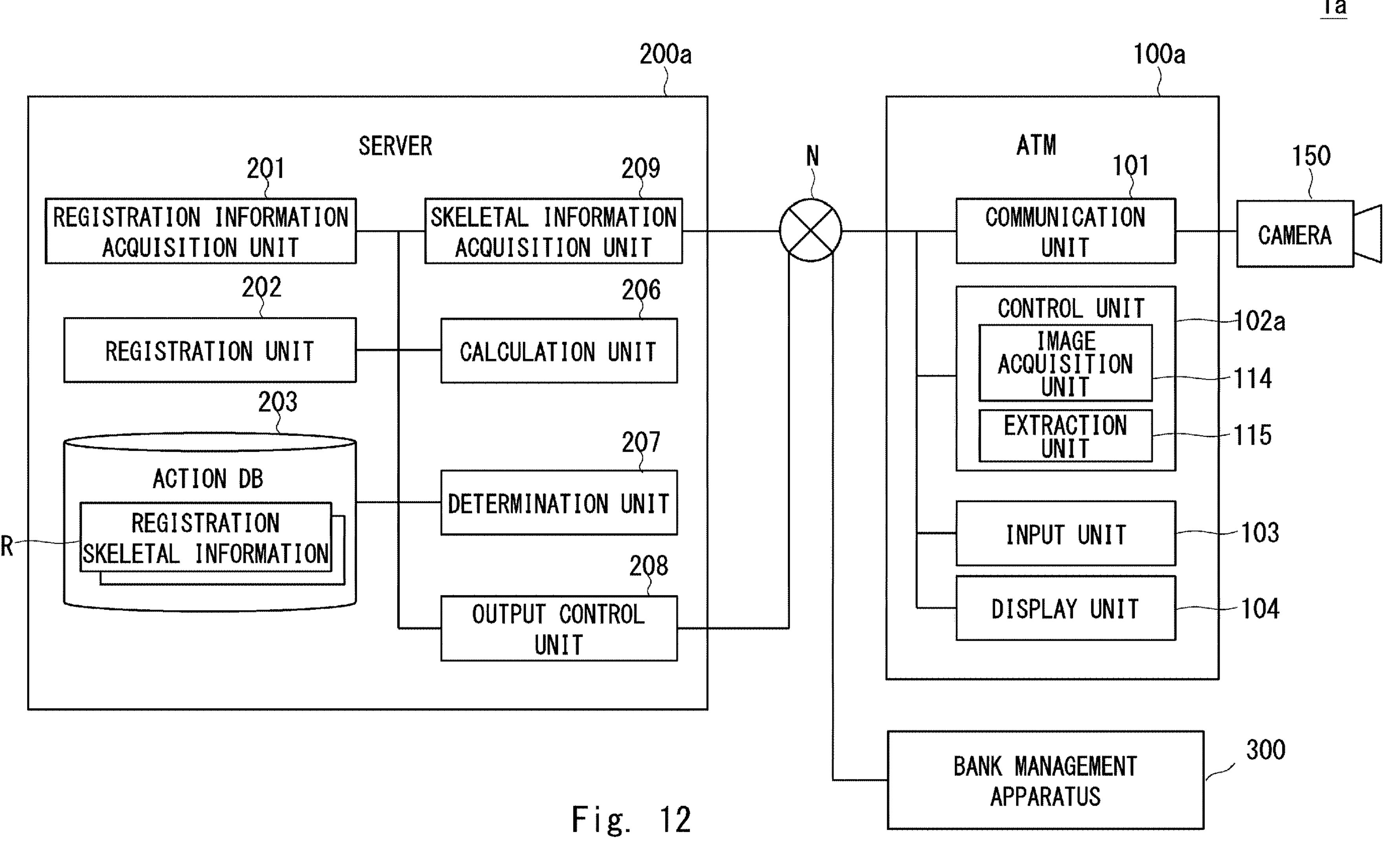
FIG. 12 is a block diagram showing a configuration of a monitoring system according to a third example embodiment.

The third example embodiment is characterized in that processing for extracting skeletal information is executed at an ATM. FIG. 12 is a block diagram showing a configuration of a monitoring system 1*a* according to the third example embodiment. The monitoring system 1*a* differs from the monitoring system 1 in that it includes an ATM 100*a* and a server 200*a* instead of the ATM 100 and the server 200.

(ATM 100*a*)

The ATM 100*a* differs from the ATM 100 in that it includes a control unit 102*a* instead of the control unit 102. Although the control unit 102*a* executes normal processing of the ATM 100 like in the case of the control unit 102, the control unit 102*a* includes an image acquisition unit 114 and an extraction unit 115.

The image acquisition unit 114 acquires video image data from the camera 150. The image acquisition unit 114 supplies a frame image included in the acquired video image data to the extraction unit 115.

The extraction unit 115 extracts a body image from a frame image and extracts skeletal information about at least a part of the body of the user U from the body image like in the case of the extraction unit 205. The extraction unit 115 transmits the extracted skeletal information to the server 200*a* through the network N. At this time, the extraction unit 115 may start the above-described processing for extracting the body image or processing for extracting the skeletal information by using the detection of the first operation signal as a trigger. Further, the extraction unit 115 may end the above-described processing for extracting the body image or processing for extracting the skeletal information by using the detection of the second operation signal as a trigger. By doing so, the computational load can be minimized. Alternatively, the extraction unit 115 may start transmission of the skeletal information by using the detection of the first operation signal as a trigger, and may end the transmission of the skeletal information by using the detection of the second operation signal as a trigger. By doing so, the amount of communication data can be minimized and processing performed by the server 200 can be omitted, and thus computational resources can be saved.

Note that the bank management apparatus 300 may have the functions of the image acquisition unit 114 and the extraction unit 115. In this case, the ATM 100*a* may transmit the video image data acquired from the camera 150 to the bank management apparatus 300, and the bank management apparatus 300 may extract skeletal information. Then the bank management apparatus 300 may transmit the extracted skeletal information to the server 200.

(Server 200*a*)

The server 200*a* differs from the server 200 in that it includes a skeletal information acquisition unit 209 instead of the image acquisition unit 204, the extraction unit 205, and the calculation unit 206. The skeletal information acquisition unit 209 acquires skeletal information from the ATM 100 and supplies the skeletal information to the calculation unit 206.

Fourth Example Embodiment

Next, a fourth example embodiment of the present disclosure will be described. The fourth example embodiment is characterized in that a series of event detection processes are executed at an ATM.

Figure 13:
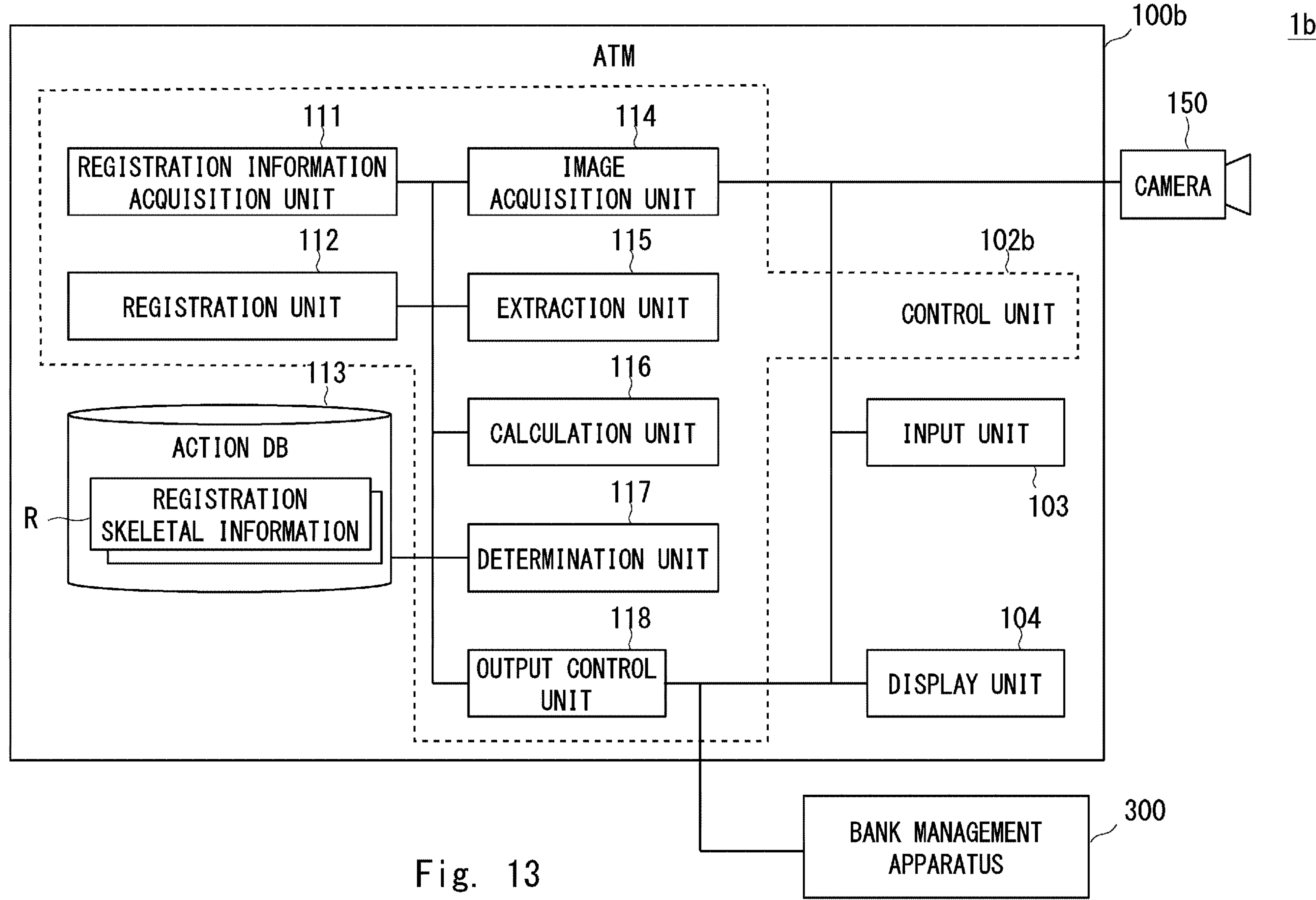
FIG. 13 is a block diagram showing a configuration of a monitoring system according to a fourth example embodiment.

FIG. 13 is a block diagram showing a configuration of a monitoring system 1*b* according to the fourth example embodiment. The monitoring system 1*b* differs from the monitoring system 1*a* in that it includes an ATM 100*b* instead of the ATM 100*a* and the server 200*a*.

The ATM 100*b* differs from the ATM 100*a* in that it includes a control unit 102*b* and an action DB 113 instead of the communication unit 101 and the control unit 102*a*.

The control unit 102*b* differs from the control unit 102*a* in that it includes a registration information acquisition unit 111, a registration unit 112, a calculation unit 116, a determination unit 117, and an output control unit 118. The registration information acquisition unit 111, the registration unit 112, the calculation unit 116, the determination unit 117, and the output control unit 118 respectively execute processes similar to those executed by the registration information acquisition unit 201, the registration unit 202, the calculation unit 206, the determination unit 207, and the output control unit 208. The action DB 113 is similar to the action DB 203. That is, the ATM 100*b* is an example of the above-described event detection system 10.

As described above, according to the fourth example embodiment, the ATM 100*b* executes a series of event detection processes. Since the exchange of information through the network N is omitted, it is possible to reduce the amount of communication data, avoid processing delays, and increase the security level.

Note that the bank management apparatus 300 may have some or all of the functions of the control unit 102*b* other than the normal ATM function.

Fifth Example Embodiment

Next, a fifth example embodiment of the present disclosure will be described. The fifth example embodiment is characterized in that parameters (referred to as degree of similarity calculation parameters) used when the degree of similarity between pieces of skeletal information is calculated are learned during operation.

Figure 14:
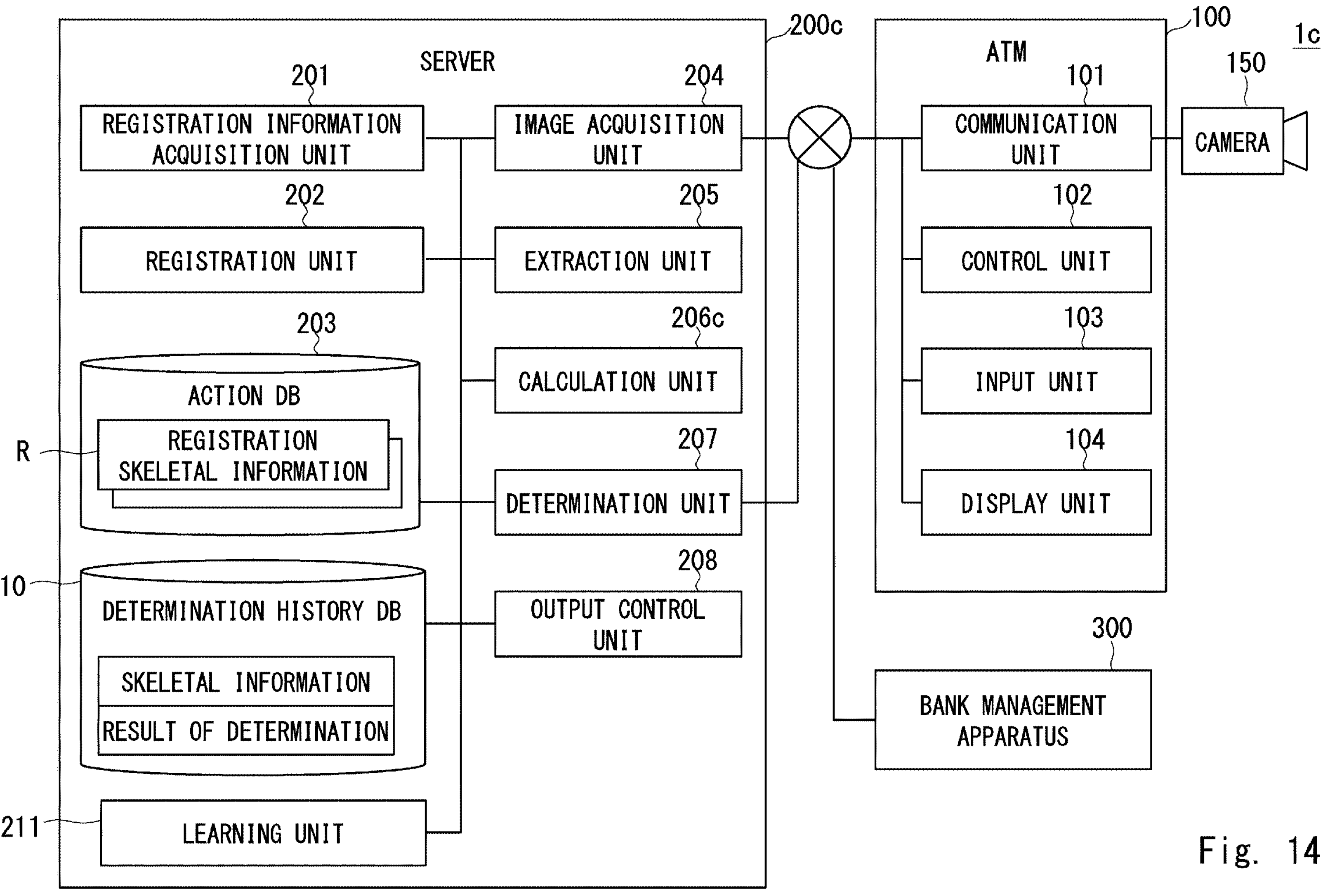
FIG. 14 is a block diagram showing a configuration of a monitoring system according to a fifth example embodiment.

FIG. 14 is a block diagram showing a configuration of a monitoring system 1*c* according to the fifth example embodiment. The monitoring system 1*c* differs from the monitoring system 1 in that it includes a server 200*c* instead of the server 200.

The server 200*c* includes a calculation unit 206*c*, a determination history DB 210, and a learning unit 211 instead of the calculation unit 206.

The calculation unit 206*c* calculates the degree of similarity between the extracted skeletal information and each registration skeletal information R registered in the action DB 203 by using the degree of similarity calculation parameters.

The determination history DB 210 is a storage apparatus that associates skeletal information extracted by the extraction unit 205 in the past with a result of the determination made by the determination unit 207 based on the above extracted skeletal information and stores them as a determination history.

Note that when an error occurs in one of skeleton extraction processing, calculation processing, and determination processing, an erroneous determination may occur. For example, in the following cases, an erroneous determination occurs.

(1) A case in which although skeletal information indicating a phone call behavior is correctly extracted, it is not determined that it is a phone call due to an error occurred in the calculation or determination processing.

(2) A case in which even though a phone call behavior was not performed, it is determined that it is a phone call due to an error occurred in the skeleton extraction.

Since a result of erroneous determination or skeletal information that was erroneously extracted described above is stored in the determination history DB 210 as a determination history, the accuracy of a model is reduced when the server 200*c* executes learning processing using the stored determination history. Therefore, the server 200*c* may correct the result of the determination made by the determination unit 207 and the extracted skeletal information, and then store the corrected information as a determination history in the determination history DB 210. By doing so, the accuracy of a model can be prevented from being reduced. For example, in the case of (1), the correction may be a correction of the result of the determination, and the skeletal information is not required to be corrected. Further, in the case of (2), the correction may be a proper correction of the skeletal information, a correction of the result of the determination, or a correction of both the result of the determination and the skeletal information. Note that the correction may be made based on an input by a user, or may be made by any other method.

The learning unit 211 learns the degree of similarity calculation parameters by using the skeletal information and the result of the determination stored in the determination history DB 210. The learning method is not limited thereto, and, for example, distance learning can be used. The learning unit 211 updates the degree of similarity calculation parameters used by the calculation unit 206*c* to the learned degree of similarity calculation parameters.

Figure 15:
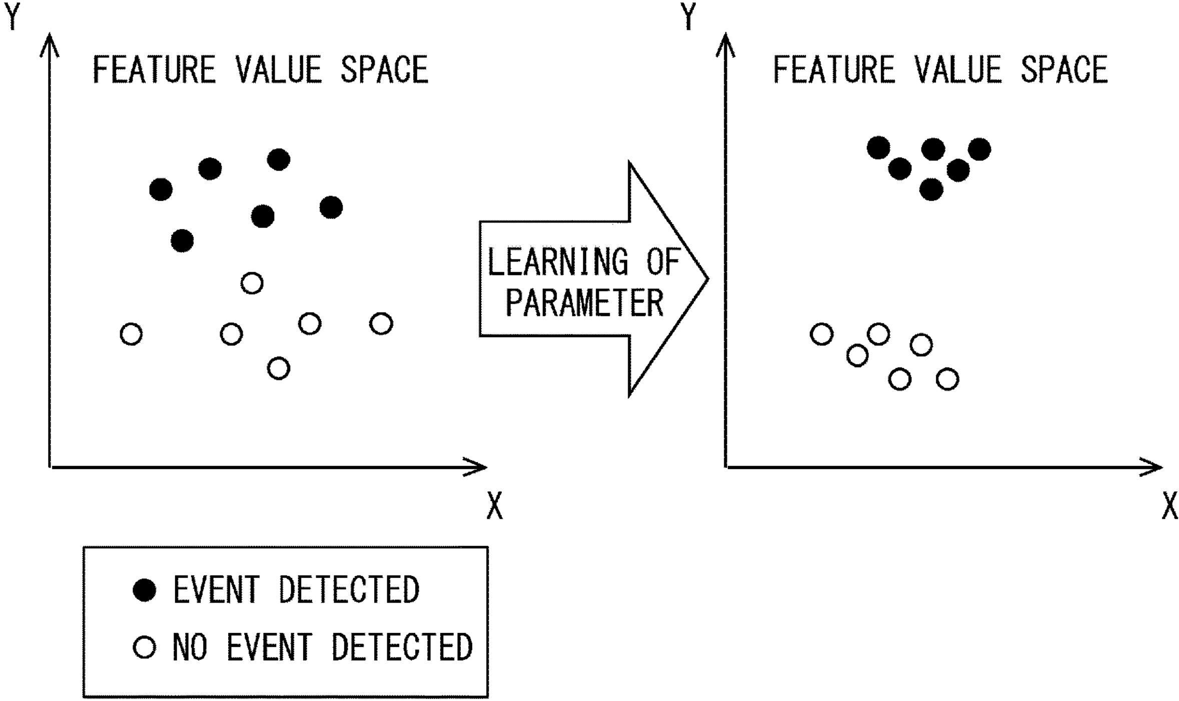
FIG. 15 is a diagram for explaining processing for learning degree of similarity calculation parameters according to the fifth example embodiment.

FIG. 15 is a diagram for explaining processing for learning degree of similarity calculation parameters according to the fifth example embodiment. A black circle in FIG. 15 plots the feature value of the skeletal information for which it is determined that an event has been detected in a predetermined space. Further, a white circle in FIG. 15 plots the feature value of the skeletal information for which it is not determined that an event has been detected in the predetermined space. The feature value is calculated from the skeletal information by using the degree of similarity calculation parameters. As shown in FIG. 15, the black circles and the white circles are scattered before the learning of the parameters. The learning unit 211 learns the degree of similarity calculation parameters so that the distance between the black circle and the white circle increases and the boundary between the clusters is made clear. As a result, the accuracy of the calculation of the degree of similarity and the accuracy of the determination as to whether an event has been detected can be improved during operation.

Although the present disclosure has been described as a hardware configuration in the above example embodiments, the present disclosure is not limited thereto. In the present disclosure, any processing can also be implemented by causing a processor to execute a computer program.

In the examples described above, the program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described example embodiments and may be changed as appropriate without departing from the scope and spirit of the present disclosure. For example, the third or the fourth example embodiment may be combined with the fifth example embodiment.

The whole or part of the example embodiments disclosed above can be described as, but not limited to, the following supplementary notes.

(Supplementary Note 1)

An event detection system comprising:

calculation means for calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and determination means for determining that an event related to the ATM has been detected when the degree of similarity is equal to or greater than a predetermined threshold.

(Supplementary Note 2)

The event detection system according to supplementary note 1, further comprising:

image acquisition means for acquiring the captured image; and extraction means for extracting the skeletal information about at least a part of a body of the user based on the captured image.

(Supplementary Note 3)

The event detection system according to supplementary note 2, wherein the image acquisition means acquires the captured image in response to detection of a predetermined operation signal sent to the ATM, or the extraction means starts extraction of the skeletal information in response to detection of the predetermined operation signal sent to the ATM.

(Supplementary Note 4)

The event detection system according to any one of supplementary notes 1 to 3, wherein the registration image shows an action of the person talking on a phone and performing an input operation in the ATM.

(Supplementary Note 5)

The event detection system according to any one of supplementary notes 1 to 4, wherein when the degree of similarity is equal to or greater than a predetermined threshold and it is determined that the user has a predetermined attribute, the determination means determines that the event has been detected.

(Supplementary Note 6)

The event detection system according to supplementary note 5, wherein the determination means acquires an attribute of the user based on information read by the ATM.

(Supplementary Note 7)

The event detection system according to any one of supplementary notes 1 to 6, wherein when the degree of similarity is equal to or greater than a predetermined threshold and a predetermined operation signal sent to the ATM has been detected, the determination means determines that the event has been detected.

(Supplementary Note 8)

The event detection system according to any one of supplementary notes 1 to 7, further comprising learning means for learning a degree of similarity calculation parameter by using the skeletal information and a result of the determination made by the determination means, wherein the calculation means calculates the degree of similarity by using the degree of similarity calculation parameter.

(Supplementary Note 9)

The event detection system according to any one of supplementary notes 1 to 8, comprising registration means for registering skeletal information extracted from the registration image in the action database as registration skeletal information.

(Supplementary Note 10)

The event detection system according to supplementary note 9, wherein when it is determined that the user has a predetermined attribute, the registration means asks a management apparatus whether to register the skeletal information extracted from the captured image in the action database.

(Supplementary Note 11)

A monitoring system comprising:

an ATM; and an event detection apparatus configured to detect an event related to the ATM, wherein the event detection apparatus comprises:

calculation means for calculating a degree of similarity between at least a part of skeletal information extracted from a captured image in which a user who is visiting the ATM is captured and at least a part of registration skeletal information, the registration skeletal information being extracted from a registration image showing a phone call action of a person and being registered in an action database; and determination means for determining that the event has been detected when the degree of similarity is equal to or greater than a predetermined threshold.

(Supplementary Note 12)

An event detection method comprising:

calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and determining that an event related to the ATM has been detected when the degree of similarity is equal to or greater than a predetermined threshold.

(Supplementary Note 13)

A non-transitory computer readable medium storing a program for causing a computer to execute:

calculation processing for calculating a degree of similarity between at least a part of skeletal information extracted from a captured image in which a user who is visiting an ATM is captured and at least a part of registration skeletal information, the registration skeletal information being extracted from a registration image showing a phone call action of a person and being registered in an action database; and determination processing for determining that an event related to the ATM has been detected when the degree of similarity is equal to or greater than a predetermined threshold.

REFERENCE SIGNS LIST

10 EVENT DETECTION SYSTEM
1, 1*a*, 1*b*, 1*c* MONITORING SYSTEM
16, 116, 206, 206*c* CALCULATION UNIT
17, 117, 207 DETERMINATION UNIT
100, 100*a*, 100*b* ATM
101 COMMUNICATION UNIT
102, 102*a*, 102*b* CONTROL UNIT
103 INPUT UNIT
104 DISPLAY UNIT
111, 201 REGISTRATION INFORMATION ACQUISITION UNIT
112, 202 REGISTRATION UNIT
113, 203 ACTION DB
114, 204 IMAGE ACQUISITION UNIT
115, 205 EXTRACTION UNIT
118, 208 OUTPUT CONTROL UNIT
150 CAMERA
200, 200*a*, 200*c* SERVER
209 SKELETAL INFORMATION ACQUISITION UNIT
210 DETERMINATION HISTORY DB
211 LEARNING UNIT
300 BANK MANAGEMENT APPARATUS
500 FRAME IMAGE
600, 601, 700 DISPLAY SCREEN
U USER
P MOBILE PHONE
R REGISTRATION SKELETAL INFORMATION

What is claimed is:

1. An event detection system comprising:

at least one memory storing instructions; and at least one processor configured to execute the instructions to:

in response to detection of a predetermined operation signal sent to an Automatic Teller Machine (ATM), extract skeletal information from a captured image in which a user who is visiting the ATM is captured;

calculate a plurality of degrees of similarity between at least a part of the skeletal information and at least a part of registration skeletal information, the registration skeletal information being extracted from a registration image showing a phone call action of a person visiting and operating the ATM and being registered in an action database; and determine that an event related to the ATM has been detected in case that at least one of the calculated similarities is equal to or greater than a predetermined threshold.

2. The event detection system according to claim 1, wherein the at least one processor configured to execute the instructions to:

acquire the captured image; and extract the skeletal information about at least a part of a body of the user based on the captured image.

3. The event detection system according to claim 1, wherein the registration image shows an action of the person talking on a phone and performing an input operation in the ATM.

4. The event detection system according to claim 1, wherein in case that at least one of the calculated similarities is equal to or greater than a predetermined threshold and it is determined that the user has a predetermined attribute, the at least one processor configured to execute the instructions to determine that the event has been detected.

5. The event detection system according to claim 4, wherein the at least one processor configured to execute the instructions to acquire an attribute of the user based on information read by the ATM.

6. The event detection system according to claim 1, wherein in case that at least one of the calculated similarities is equal to or greater than a predetermined threshold and a predetermined operation signal sent to the ATM has been detected, the at least one processor configured to execute the instructions to determine that the event has been detected.

7. The event detection system according to claim 1, wherein the at least one processor configured to execute the instructions to learn a plurality of degrees of similarity calculation parameter by using the skeletal information and a result of the determination of the event, wherein the at least one processor configured to execute the instructions to calculate the plurality of degrees of similarity by using the plurality of degrees of similarity calculation parameter.

8. The event detection system according to claim 1, the at least one processor configured to execute the instructions to register skeletal information extracted from the registration image in the action database as registration skeletal information.

9. The event detection system according to claim 8, wherein when it is determined that the user has a predetermined attribute, the at least one processor configured to execute the instructions to ask a management apparatus whether to register the skeletal information extracted from the captured image in the action database.

10. The event detection system according to claim 1, wherein the skeletal information includes a plurality of key points detected from a body.

11. The event detection system according to claim 10, wherein the skeletal information includes a plurality of bones indicating links between the key points, at least one of the plurality of bones being detected from the body.

12. The event detection system according to claim 1, wherein the skeletal informationskeleton-information is extracted from an upper body.

13. An event detection method comprising:

in response to detection of a predetermined operation signal sent to an Automatic Teller Machine (ATM), extracting skeletal information from a captured image in which a user who is visiting the ATM is captured;

calculating a plurality of degrees of similarity between at least a part of the skeletal information is captured and at least a part of registration skeletal information, the registration skeletal information being extracted from a registration image showing a phone call action of a person visiting an operating the ATM and being registered in an action database; and determining that an event related to the ATM has been detected in case that at least one of the calculated similarities is equal to or greater than a predetermined threshold.

14. A non-transitory computer readable medium storing a program for causing a computer to execute:

extracting processing for, in response to detection of a predetermined operation signal sent to an Automatic Teller Machine (ATM), extracting skeletal information from a captured image in which a user who is visiting the ATM is captured;

calculation processing for calculating a plurality of degrees of similarity between at least a part of the skeletal information and at least a part of registration skeletal information, the registration skeletal information being extracted from a registration image showing a phone call action of a person visiting and operating the ATM and being registered in an action database; and determination processing for determining that an event related to the ATM has been detected in case that at least one of the calculated similarities is equal to or greater than a predetermined threshold.

* * * * *